(12) United States Patent
Sassi

(10) Patent No.: US 6,273,428 B1
(45) Date of Patent: Aug. 14, 2001

(54) ANNULAR SEAL ASSEMBLY, IN PARTICULAR FOR THE DRIVE SHAFT OF A VEHICLE

(75) Inventor: Mauro Sassi, Moncalieri (IT)

(73) Assignee: RFT S.p.A., Turin (IT)

( * ) Notice: Subject to any disclaimer, the term of this patent is extended or adjusted under 35 U.S.C. 154(b) by 0 days.

(21) Appl. No.: 09/373,582

(22) Filed: Aug. 13, 1999

(30) Foreign Application Priority Data

Aug. 18, 1998 (IT) .................................................. TO98A0716

(51) Int. Cl.[7] .............................. F16J 15/34; F16J 15/54
(52) U.S. Cl. ..................... 277/348; 277/352; 277/361; 277/374; 277/402; 277/407
(58) Field of Search ..................................... 277/348, 352, 277/361, 371, 374, 402, 407, 559, 560, 561, 566

(56) References Cited

U.S. PATENT DOCUMENTS

| | | |
|---|---|---|
| 3,822,890 | * 7/1974 | Bourgeois . |
| 3,871,669 | * 3/1975 | Repella . |
| 4,460,184 | * 7/1984 | Colanzi et al. . |
| 4,596,394 | 6/1986 | Schmitt . |
| 4,770,425 | 9/1988 | Colanzi et al. . |
| 4,799,808 | * 1/1989 | Otto . |
| 4,928,979 | * 5/1990 | Nagasawa . |
| 4,986,552 | * 1/1991 | Anzue et al. . |
| 5,042,822 | * 8/1991 | Dreschmann et al. . |
| 5,348,312 | 9/1994 | Johnston . |
| 5,676,383 | * 10/1997 | Chandler . |
| 5,967,527 | * 10/1999 | Fabro et al. . |
| 5,975,534 | * 11/1999 | Tajima et al. . |

FOREIGN PATENT DOCUMENTS 3739513   6/1989   (DE) .

* cited by examiner

*Primary Examiner*—James R. Brittain
*Assistant Examiner*—John L. Beres
(74) *Attorney, Agent, or Firm*—Burns, Doane, Swecker & Mathis, L.L.P.

(57) ABSTRACT

A seal assembly which includes first and second annular screens, mounted facing each other coaxially; the first screen carries a seal member made of an elastomeric material which includes a main annular sealing lip, which extends axially from a root portion secured on a flange portion of the first screen, towards a flange portion of the second screen facing the flange portion of the first screen; the lip includes an enlarged portion radially offset with respect to the root portion and delimited by a circumferential rim and an annular sealing projection with a V-shaped section and its sealing edge oriented axially, the circumferential rim having a radial annular seat for a resilient circumferential retaining member, able to exert a predetermined radial stress on the lip, and the V-shaped projection being arranged alongside the seat for the resilient member, with the sealing edge towards the flange portion of the second screen, with which it cooperates slidably in an axial direction; the enlarged portion of the lip is connected to the root portion by an annular portion shaped to form a resilient hinge, the center of rotation of which is arranged on a line through the said sealing edge and forms an angle α of between 20° and 60° with a radial plane.

11 Claims, 1 Drawing Sheet

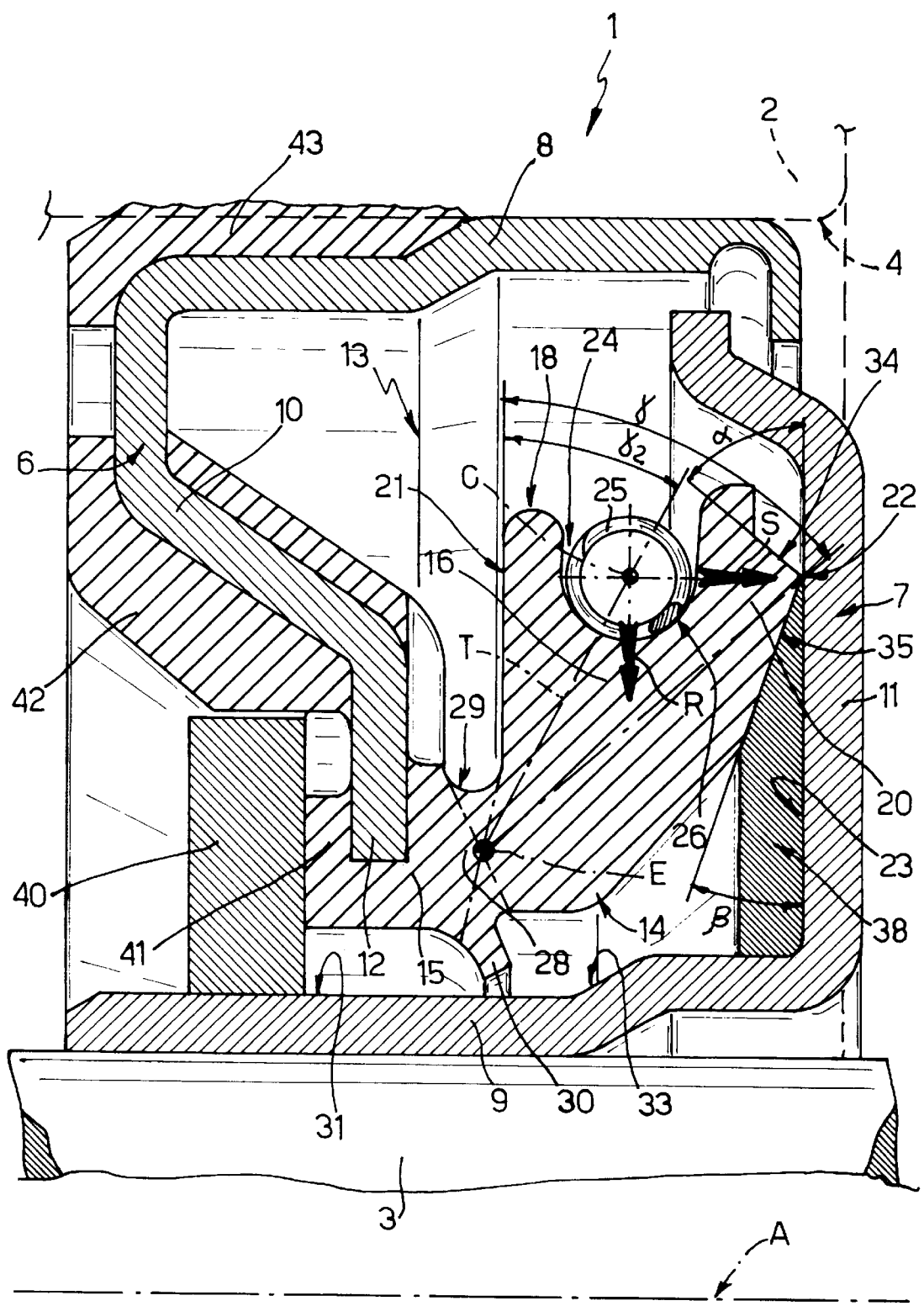

ANNULAR SEAL ASSEMBLY, IN PARTICULAR FOR THE DRIVE SHAFT OF A VEHICLE

FIELD OF THE INVENTION

The present invention relates to an annular seal assembly of a type intended for mounting between the drive shaft of a vehicle with a diesel or petrol engine and the crankcase and/or the oil sump in order to retain the oil.

BACKGROUND OF THE INVENTION

In the prior art, the same type of seal assembly has been used for a long time for this application, that is one formed by a radial V-shaped spring-loaded lip, which cooperates slidably or directly with the drive shaft or, in more sophisticated seal assemblies, with a radial surface of a sealing screen keyed on the drive shaft. In any case, the seal is exclusively radial and the sealing force exerted by the lip is in direct proportion to the load of the spring and to the state of wear of the lip.

Seal assemblies of the type described have the disadvantage of exerting a progressively deteriorating sealing action as the lip becomes worm This limits the life of this type of seal which is, in addition, sensitive to external contamination and which is therefore protected by an additional seal assembly, known as a dust shield. It is clear that this makes running costs relatively high.

SUMMARY OF THE INVENTION

The object of the invention is to provide a seal assembly free of the disadvantages described and providing a highly effective seal, which is able substantially to maintain this high efficiency even as the lip becomes progressively worn, and which is both inexpensive and compact.

This object is achieved according to the invention by providing a seal assembly which can be fitted between two relatively rotatable members, which includes a first annular screen, securely fixed to one of the said members and having a seal member made of an elastomeric material, and a sliding surface, securely fixed to a second of the said members, the said first screen comprising in turn a sleeve portion to be fitted onto the said first member and a radial flange portion arranged substantially perpendicular to the sleeve portion and substantially facing the said sliding surface; the said sealing member being carried by the said first screen at a perimetral edge of the flange portion thereof and including a first annular lip, which extends axially from the flange portion, from its root portion, towards the said sliding surface; characterised in that the said first lip includes an enlarged end portion opposite, and radially offset with respect to, the root portion, delimited by a circumferential rim and by an annular sealing projection with a V-shaped radial section and an axially oriented sealing edge; the said circumferential rim having a radial annular seat for a resilient, circumferential retaining member, operable to exert a predetermined radial stress on the first lip, the V-shaped projection being arranged beside the seat for the resilient member, with the sealing edge towards the sliding surface carried by the said second member, with which it cooperates slidably in an axial direction.

In particular, the enlarged portion of the first lip is connected to the root portion by an annular portion formed so as to constitute a resilient hinge with its centre of rotation arranged along a line passing through the said sealing edge and forming an angle (γ) of between 20° and 60° with a radial plane parallel to the said sliding surface.

In practice, the seal assembly of the invention provides an entirely similar seal to that obtained with prior art seal assemblies (where it is also possible to identify an angle γ, which is one of the parameters of the seal), with the difference, however, that the sealing action is provided axially rather than radially and with the further difference that the seat of the spring which stabilizes the sealing load is rotated through 90° with respect to the reference plane for measurement of the angle γ.

In this way, (as can be demonstrated by a series of mathematical calculations) the load imparted by the spring becomes independent of the wearing of the sealing edge, making it possible to manufacture more effective seal assemblies, which maintain the same sealing action for the entire life of the sealing lip, independently of its state of wear.

Further characteristics and advantages of the present invention will become apparent from the following description of a non-limitative embodiment, with reference to the appended drawing, which illustrates part of a radially sectioned view of a seal assembly according to the invention, the missing portion being symmetrical to that illustrated with respect to an axis of symmetry A.

BRIEF DESCRIPTION OF THE DRAWING

An exemplary embodiment of the present invention is disclosed in the following description and illustrated in the accompanying drawings, in which:

FIG. 1 illustrates an exemplary embodiment of an annular seal according to the present invention.

DETAILED DESCRIPTION OF THE INVENTION

The seal assembly 1 comprises two substantially rigid annular screens 6 and 7 formed, for example, of pressed metal, and mounted facing each other, coaxial of the axis A, which constitutes their axis of symmetry. Each screen 6, 7 includes a sleeve portion, indicated 8, 9 respectively, for fitting onto a respective member 2, 3, and a flange portion, indicated 10, 11 respectively and arranged radially, substantially perpendicular to the axis A and to a respective sleeve portion 8, 9.

The screen 6 is fitted around the sleeve portion 9 of the screen 7, in such a way that the flange portions 10, 11 are arranged on opposite sides, facing each other; at a radially inward perimetral edge 12 of the flange portion 10; the screen 6 also has a seal member 13 made of an elastomeric material and including a main annular lip 14, which extends axially from the flange portion 10, from a root portion 15 towards the flange portion 11 of the screen 7.

In addition to the root portion 15, the lip 14 also includes an enlarged end portion 16, opposite and radially offset from the root portion 15, in this case towards the sleeve portion 8; the enlarged portion 16 tapers gradually towards the root portion 15 and is delimited by a circumferential rim 18, facing the sleeve portion 8, by an annular sealing projection 20, facing the flange portion 11 and by a flat annular face 21 disposed opposite the projection 20 and substantially perpendicular to the sleeve portions 8, 9, facing the flange portion 10 of the screen 6.

The sealing projection 20 is of a type used in prior art radial seals and therefore has a V-shaped radial section defining at its tip a sealing edge 22 which, according to the invention and on the basis of the description so far, is, however, oriented axially and cooperates slidably with a sealing surface 23 of the flange portion facing the flange portion 10, and is operable, therefore, to form with the latter an axial seal between the members 2 and 3, closing the hole 4.

Again according to the invention, in order to provide a constant, predetermined sealing load, constituting a predetermined contact pressure between the edge 22 and the surface 23, the circumferential edge 18 has a radial annular seat 24, open to the sleeve portion 8, for a resilient circumferential retaining member, constituted by a known helical spring 25, which is curved and joined end to end so as to form a toroidal element able to exert a predetermined radial stress R (indicated by an arrow) on the lip 14 which, thanks to the particular structure described here, is translated, as will be seen, into an axial stress S on the portion 16 for urging the edge 22 against the surface 23.

In order to exploit advantageously the structure described so far, on the one hand the V-shaped projection 20 must be arranged alongside the seat 24 for the resilient member 25, with the sealing edge 22 facing the flange portion 11 while, in particular, the seat 24 must be formed so as to be defined by a groove delimited by a semi-circular bottom 26 with a centre of curvature C arranged at substantially the same radial distance from the two sleeve portions 8, 9 of the sealing edge 22, that is aligned radially and coaxially of the latter, while on the other hand, the enlarged portion 16 must be given a certain degree of freedom, by connecting it to the root portion 15 by an extension portion of the lip 14 constituted by an intermediate annular portion 28, extending axially towards the screen 7; the portion 28 is shaped so as to constitute a resilient hinge, the centre of rotation E thereof being arranged on an ideal line (illustrated by a dot-dash line and indicated T in the drawing) passing through the sealing edge 22 and forming an angle γ of between 20° and 60° with a radial plane, substantially parallel to the flange portions 10, 11.

In particular, the portion 28 connecting the root portion 15 and the enlarged end portion 16 acts as a hinge as it is delimited radially, towards the seat 24, by a semicircular groove 29 forming a localized weakness along the portion; on the opposite side, the portion 28 of the lip 14 also has a second lip 30 projecting therefrom, which cooperates with clearance with the sleeve portion 9 of the screen 7; in this instance, the lip 30 extends radially, and slightly obliquely, towards the sleeve portion 9 from the root portion 15 for the entire axial width of the portion 28, so as to be progressively nearer the flange portion 11. The lip 30 cooperates with clearance with a surface 31 of the sleeve portion 9, which is shaped so as to define a step 33 arranged substantially facing the lip 30 and beneath the enlarged portion 16 of the main lip 14, between the lip 30 and the respective flange portion 11, so as to provide a supplementary labyrinth seal, acting radially this time, between the main lip 14 and the surface 31.

In this type of arrangement, the centre of rotation E is defined, as illustrated by a dot-dash line in the drawing, by the intersection point of the diagonals extending between the axial ends of the groove 29 and the opposite sides of the lip 30.

Like prior art radial projections, the V-shaped projection 20 has first and second sides, indicated 34 and 35 respectively, delimiting opposite sides of the sealing edge 22, each side 34, 35 being defined by a conical surface forming a predetermined angle with the sliding surface 23 of the flange portion 11.

In particular, the conical surface of the side 34 forms an angle a of between 30° and 80° with the sliding surface 23,
while the conical surface of the side 35 forms an angle β, of between 10° and 45° with the surface 23. In addition, the side 35 has a plurality of grooves 38, fading towards the edge 22, of the type formed on a prior art radial sealing lip.

In the embodiment illustrated, the screen 6 is axially locked onto the sleeve portion 9 of the screen 7, with the V-shaped projection 20 arranged with its edge 22 against the flange portion 11, by a ring 40 engaged by interference on the sleeve portion 9, opposite the respective flange portion 11 so as to bear axially against an elastomeric plug 41 of the flange portion 10, formed in one piece with the seal member 13, and defined in particular by an extension of the root portion 15 of the lip 14.

The flange portions 10, 11 are also formed into known shapes in order to increase their mechanical strength, and the screen 6 has further extensions 42, 43 of the sealing member 13, formed in one piece therewith and bonded to the screen 6 during the vulcanization step; the extension 42 provides a radial support plug for the screen 6; this latter is able, in fact, to contact the ring 41, by means of the extension 42, when the seal assembly 1 is not yet mounted into the seat 4, thereby maintaining itself substantially coaxial with the screen 7; the extension 43 is provided to improve the seal, by known means, on the housing 4; a similar rubber extension could be arranged in the cavity of the sleeve portion 9 left free by the step 33 between the former and the shaft 3, in order to lock the screen 7 to the shaft 3 more securely.

Thanks to the structure described in detail, it is possible to demonstrate, by breaking down mathematically and geometrically the forces acting on the lip 14, and in particular on the portion 16 and the edge 22, that the load S acting on the sealing edge 22 is substantially independent both of the width of the contact area between the edge 22 and the surface 23 (which is obviously not linear, that is a width of zero, since resilient deformations of the edge 22 must be taken into account), and of small axial variations in the position of the edge 22, whereby the sealing action remains substantially constant as the lip 14 progressively wears, and with it the edge 22 which tends progressively to flatten the projection 20, while ever widening the contact area with the surface 23. In addition, any deterioration in sealing effectiveness occurs only in the case of far more severe wear than is the case with prior art radial seals, since the combined action of the spring 25 and resistance on the surface 23 creates conditions which stabilize the passage of oil which progressively fills the contact space.

It is clear that numerous modifications and variations may be made to the seal assembly described here without departing from the scope of the invention: in particular, it is clear that the sliding surface 23 could be formed directly on the shaft 3 rather than on the screen 7, or on any other part interposed between the shaft 3 and the seal assembly: in this event, the screen 7 could be dispensed with.

What is claimed is:

1. A seal assembly for fitting between two relatively rotatable members, comprising a first annular screen, securely fixed to a first of the said members and having a seal member made of an elastomeric material, and a sliding surface carried by a second of the said members, said first screen comprising in turn a sleeve portion for fitting to said first member and a flange portion, said flange portion disposed radially, substantially perpendicular to the sleeve portion and substantially facing said sliding surface; said seal member being carried by said first screen at a perimetrical edge of the flange portion thereof, and including a first annular lip which extends axially from the flange portion, from a root portion thereof, towards said sliding surface;

wherein said first lip includes an enlarged end portion, opposite and radially offset from the root portion, delimited by a circumferential rim and an annular sealing projection, said annular sealing projection having a V-shaped projection and a sealing edge oriented axially; said circumferential rim being provided with a radial annular seat for a resilient circumferential retaining member, said resilient circumferential retaining member able to exert a predetermined radial stress on the first lip, and the V-shaped projection being disposed alongside the seat, with the sealing edge facing towards the sliding surface carried by said second member, said sealing edge and said sliding surface cooperate slidably in an axial direction;

wherein said enlarged portion of the first lip is connected to the root portion by an annular portion shaped so as to form a resilient hinge, a center of rotation of said resilient member being arranged on a line passing through said sealing edge and forming an angle γ between 20° and 60° with a radial plane, parallel to said sliding surface and to said flange portion of the first screen.

2. A seal assembly according to claim 1, wherein said V-shaped projection has first and second sides delimiting opposite sides of said sealing edge, each side being defined by a conical surface forming a predetermined angle with said sliding surface cooperating with said sealing edge.

3. A seal assembly according to claim 2, wherein the conical surface of said first side forms an angle (α) of between 30° and 80° with said sliding surface; while the conical surface of the second side forms an angle (β) of between 10° and 45° with said sliding surface.

4. A seal assembly according to claim 3, wherein said second side has a plurality of grooves.

5. A seal assembly according to claim 1, wherein said first annular screen and a second annular screen are mounted coaxially to face each other, said second annular screen includes a sleeve portion for fitting to one of said members and a radial flange portion substantially perpendicular to said sleeve portion of said second annular screen, the flange portions of said first and second screens facing each other; said sliding surface being defined by a surface of said flange portion of the second screen facing the flange portion of the first screen.

6. A seal assembly according to claim 5, wherein said first screen is fitted around the sleeve portion of the second screen and locked axially thereon, with the V-shaped projection arranged with the sealing edge against the flange portion of the second screen, by a ring engaged on the sleeve portion of the second screen, on the opposite side to the respective flange portion, so as to bear axially against an elastomeric plug of the flange portion of the first screen, defined by an extension of the root portion of the first lip.

7. A seal assembly according to claim 5, wherein a second lip extends radially from said root portion of the first lip towards the sleeve portion of the second screen, for cooperating with clearance with a lateral surface of the sleeve portion of the second screen, said second screen is shaped so as to form a step arranged substantially opposite the second lip, between the sleeve portion and the flange portion of the second screen, so as to provide an additional labyrinth seal.

8. A seal assembly according to claim 5, wherein said enlarged end portion tapers towards the root portion and is delimited, on the side opposite said annular projection, by a flat annular surface extending substantially perpendicular to said sleeve portions; said radial annular seat for the resilient retaining member being defined by a groove delimited by a semi-circular bottom, with a center of curvature of said resilient retaining member arranged substantially at the same radial distance from the sleeve portions as the sealing edge; a radial rib being interposed between the said groove and said projection, formed in one piece with the first lip and projecting from said circumferential rim.

9. A seal assembly according to claim 1, wherein said annular portion is shaped to form said resilient hinge is defined by an intermediate portion of the said first lip, which connects the root portion and said enlarged end portion, delimited radially towards said seat by a semi-circular groove and on the opposite side by a second lip, cooperating with clearance with the sleeve portion of the second screen, said center of rotation being defined by the point of intersection of the diagonals between the axial ends of said groove and the opposite sides of said second lip.

10. A seal assembly for fitting between two relatively rotatable members, comprising a first annular screen, securely fixed to a first of the said members and having a seal member made of an elastomeric material, and a sliding surface carried by a second of the said members, said first screen comprising in turn a sleeve portion for fitting to said first member and a flange portion, said flange portion disposed radially, substantially perpendicular to the sleeve portion and substantially facing said sliding surface; said seal member being carried by said first screen at a perimetrical edge of the flange portion thereof, and including a first annular lip which extends axially from the flange portion, from a root portion thereof, towards said sliding surface; said first annular lip being coaxial with a substantially cylindrical surface carried by said second member and perpendicular to said sliding surface; wherein said first lip includes an enlarged end portion, opposite and radially offset from the root portion, delimited by a circumferential rim and an annular sealing projection, said annular sealing projection having a V-shaped projection and a sealing edge oriented axially; said circumferential rim being provided with a radial annular seat for a resilient circumferential retaining member, said resilient circumferential retaining member able to exert a predetermined radial stress on the first lip, and the V-shaped projection being disposed alongside the seat, with the sealing edge facing towards the sliding surface carried by said second member, said sealing edge and said sliding surface cooperate slidably in an axial direction; and wherein said enlarged portion of the first lip is connected to the root portion by an annular portion shaped so as to form a resilient hinge, the center of rotation of the resilient hinge being separate from said surface carried by the second member and arranged on a radial plane, parallel to said sliding surface, at a predetermined radial distance from said surface carried by the second member.

11. A seal assembly for fitting between a first and second rotatable member, comprising:

a first annular screen having a flange portion and a sleeve portion, said sleeve portion allows said first annular screen to fit onto said first rotatable member;

a seal member carried on a perimetrical edge of the first annular screen and made of elastomeric material;

a first annular lip which extends axially from a root portion and towards a sliding surface of said second rotatable member, and said first annular lip includes an enlarged portion which is delimited by a circumferential rim and an annular sealing projection with a V-shaped projection and a sealing edge;

a resilient circumferential retaining member, able to exert a predetermined radial stress on the first annular lip, being disposed in the V-shaped projection along an annular sear portion of the circumferential rim; and wherein said enlarged portion of the first lip is connected to the root portion by an annular portion shaped so as to form a resilient hinge, a center of rotation of said resilient hinge being arranged on a line passing through said sealing edge and forming an angle $\gamma$ between 20° and 60° with a radial plane, parallel to said sliding surface and to said flange portion of the first screen.

* * * * *